Patented Nov. 9, 1948

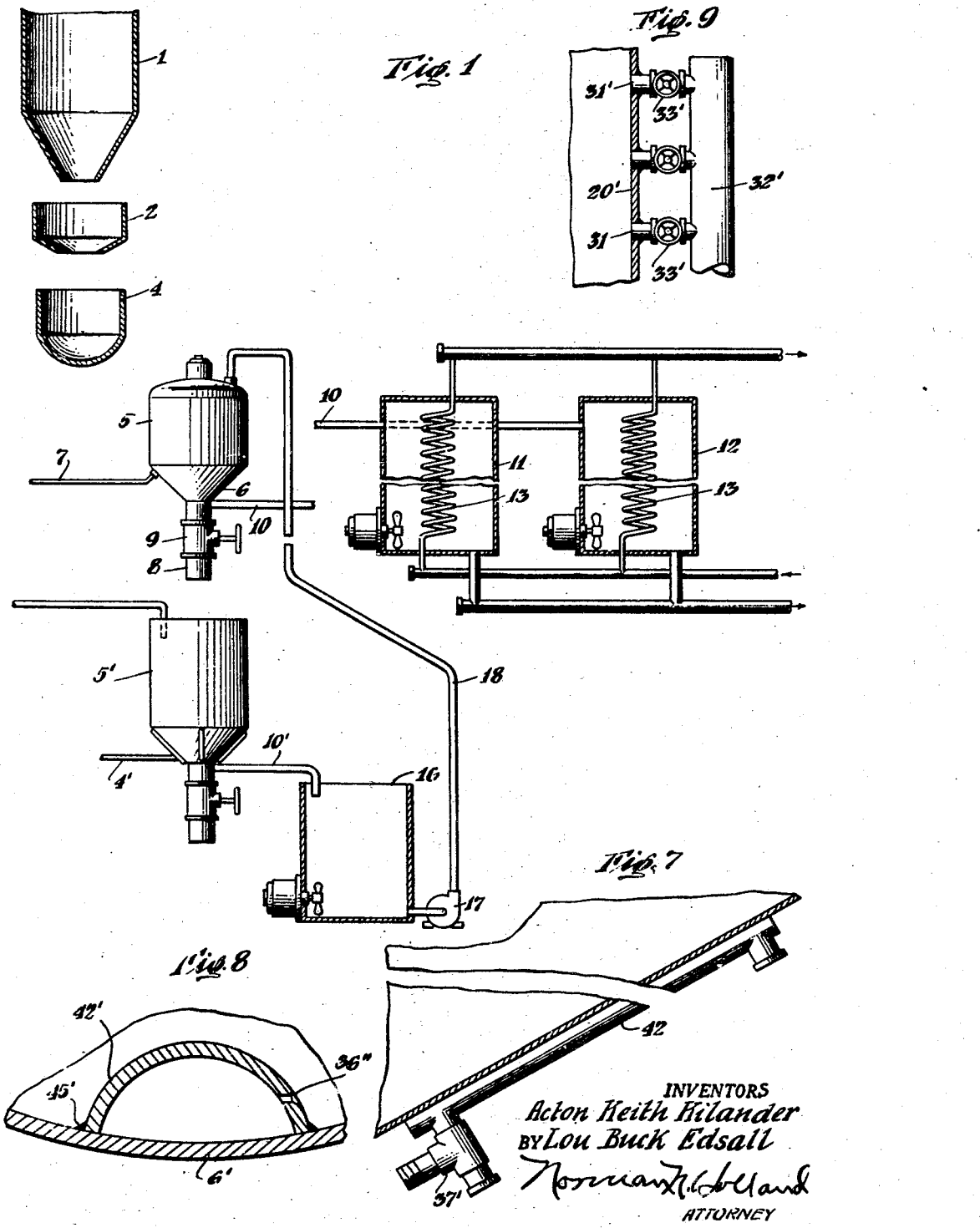

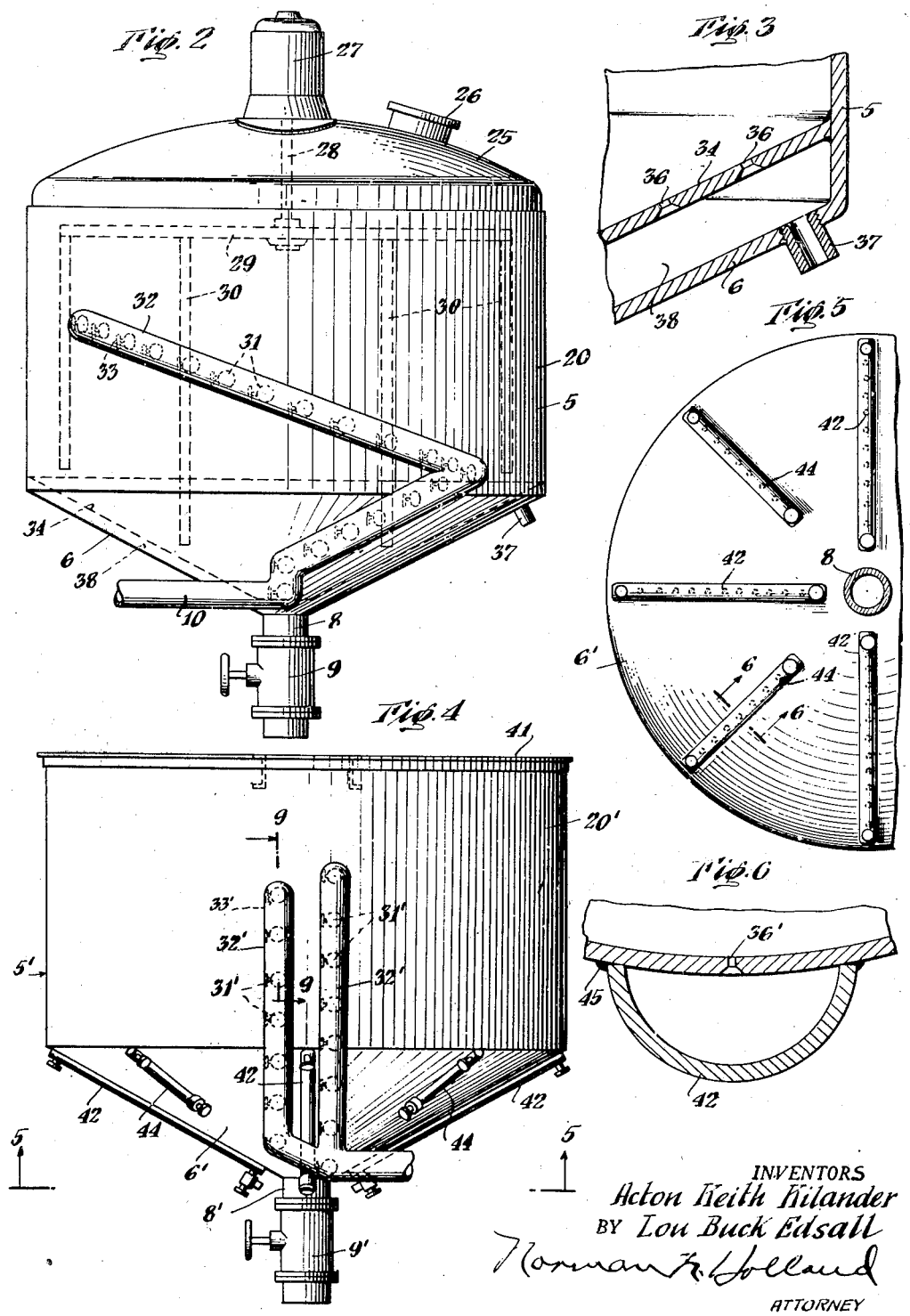

2,453,310

UNITED STATES PATENT OFFICE 2,453,310

APPARATUS FOR SEPARATING STARCH FROM GLUTEN

Lou Buck Edsall, Wyandotte, and Acton Keith Kilander, Gibralter, Mich., assignors, by mesne assignments, of 9,448/10,570 to Chemprotin Products, Trenton, Mich., a limited partnership, 561/10,570 to Laszlo Kormendi, New York, N. Y., and 561/10,570 to B. Clark Boeckeler, Gross Ile, Mich.

Application December 20, 1943, Serial No. 515,060

11 Claims. (Cl. 127—24)

The present invention relates to an improved method and apparatus for separating starch from gluten.

Starch made from wheat is used in many industries. In some industries the starch is put through manufacturing procedures while it still carries much or all of the gluten of the grain, and the tacky gluten present introduces numerous difficulties.

In other industries nearly pure starch is essential. To prepare the starch for use in these latter industries it has been customary, for many years, to settle out the starch by flowing a thin water-suspension of the ground grain over long tables on which the starch settles out while other impurities flow on and are collected separately.

The separated gluten obtained by this latter process commands a much higher price than gluten which has been put through various manufacturing processes while still admixed with the starch, but the table method of separating gluten is slow, requires careful watching, and is therefore expensive in labor and necessitates a large investment in plant.

One object of the present invention is to provide an improved and economical method and apparatus for separating starch from gluten.

Another object is to recover the gluten in such form that the resulting gluten is unimpaired by detrimental manufacturing operations.

Another object of the present invention is to provide an improved method and apparatus for separating starch from gluten.

Another object of the invention is to obtain an effective separation of starch and gluten.

Another object of the invention is to prepare gluten by separating the starch in such a manner that the gluten is recovered in its most desirable and valuable form.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a schematic view, illustrating the several steps in the process and a diagrammatic view of the apparatus;

Fig. 2 is a side elevational view illustrating part of the mechanism utilized in separating the starch from the gluten;

Fig. 3 is a detailed sectional view of the air chamber formed at the bottom of the tank shown in Fig. 2;

Fig. 4 is a side elevation view of the secondary tank which differs in certain particulars from the primary tank;

Fig. 5 is a bottom view of the secondary tank illustrating the air connections at the bottom of the tank;

Fig. 6 is a detailed sectional view along line 6—6 of Fig. 5 illustrating the attachment of pipes for the injection of air at the bottom of the secondary tank;

Fig. 7 is a detailed view of one of the pipes attached to the bottom of the tank;

Fig. 8 is a detailed sectional view of a modified construction illustrating one of the pipes attached to the bottom of the tank on the interior thereof with air outlets directed circumferentially of the tank; and Fig. 9 is a sectional view along the line 9—9 of Fig. 4 with parts shown in elevation.

Referring again to the drawings and more particularly to Fig. 1 thereof, which illustrates one way of performing the method of and a schematic view of the apparatus, there is shown a bin 1 for containing ground wheat. The wheat does not have to be ground unduly fine as ground grain which will pass through a thirty or forty mesh screen has been found to be satisfactory.

Where the wheat is to be used in the manufacture of starch, for example, about twenty-five to thirty percent should be separated out as bran and sold as animal feed. In the separation of the gluten, when the grain is to be used in the manufacture of starch, there is a certain amount of water and sugar which has to be removed, this may amount to as much as fifteen percent. The present invention is primarily concerned with the separation of starch and gluten.

The ground grain may be delivered from the bin 1 to a scale 2 for weighing and may be dropped from the scale into a mixer 4 where water is supplied to the ground grain and the two thoroughly mixed until a batter is formed. These elements are shown schematically in the drawings. As an example of the mixer 4, a machine for making dough in a bakery may be utilized. The batter is then delivered to a receptacle 5 in any suitable manner where it is mixed with water. Preferably about four to eight gallons of water should be added to each fifty-six pounds (a bushel) of ground grain from which the bran has been removed, in other words, about one to two parts of water by weight should be added to each two parts by weight of ground grain which has previously been formed into a batter. While these proportions are preferred and have been found to produce good results they can be varied substantially. Where too much water is used the solution of starch delivered is too weak and hence the capacity of the equipment is reduced. On the other hand, if insufficient water is used, the starch may not be completely separated from the gluten.

Preferably the cylindrical body part of the receptacle 5 is joined to a substantially conical or spherical bottom part 6. A supply of air is delivered to the lower part 6 of the receptacle 5 through a conduit 7. The air passing up through the water agitates the water and causes the starch to separate from the gluten and remain in solution and/or suspension. The lower part of the receptacle may have an outlet 8 with a valve 9 for removal of the gluten. The structural features of the receptacle 5 and its associated mechanism will be described in greater detail hereinafter.

After air has been injected into the water for a sufficient period to separate the major part of the starch from the grain, the solution of starch may be passed through the conduit 10 into the starch converters 11 and 12, which, for convenience are shown smaller than they are in commercial operation. These starch converters are preferably at a lower level than the outlet conduit 10 from the receptacle 5 to permit gravity flow of the liquid containing starch in solution and/or in suspension and they may be heated in any suitable manner for example by the passing of steam through the steam coils 13 therein or by omitting the coils 13 and injecting the steam directly into the liquid to maintain a constant temperature, preferably about 155° F. When a sufficient quantity of gluten has formed in the receptacle 5 it may be released through the outlet 8 by opening valve 9 and delivering it to a second receptacle 5'.

The second receptacle may be identical with the first or it may differ from it. In the preferred embodiment the secondary tank differs from the primary. Additional water may be added to the gluten and air circulated through the water by conduit 4' to remove additional starch from the gluten. The solution of starch and water, which is weaker than that obtained from the first operation, is preferably delivered through a conduit 10' to a reservoir 16 from which a pump 17 may deliver it through a pipe 18 to the first receptacle 5. It will be understood that the solution passing through the pipe 18 will be measured and the proper quantity delivered corresponding to the quantity of ground grain in the first receptacle 5.

Additional similar receptacles may be utilized for removing any starch which remains in the gluten removed from the recaptacle 5'. Ordinarily two operations are sufficient but in some cases additional operations may be desired. The gluten, when it is delivered is of a tacky nature and may be reduced to a more commercial form in any suitable manner, for example, in the manner described in the application of James H. Obey and Lou Buck Edsall, Serial No. 510,082.

While the construction of the tanks may vary without departing from the scope of the invention, a preferred embodiment of the primary tank 5 is illustrated in Fig. 2. Preferably the tank comprises, an outer cylindrical side wall 24 and a conical bottom portion 6 having an outlet 8 of substantial size, controlled by the valve 9. The upper part of the tank may be domed as shown at 25 and provided with a manhole opening 26 through which the batter may be delivered to it. A motor 27 may be mounted at the top of the tank to drive a shaft 28 operatively connected to a stirrer 29, having a plurality of downwardly extending members 30 which extend to the bottom of the tank. A plurality of drain nozzles 31 may be provided on the side of the tank and they may be inclined vertically about the tank as shown in Fig. 2 or vertically arranged as shown in Fig. 4. Preferably these nozzles connect with a common outlet pipe 32 through valves 33.

The tank 5 is preferably provided with a false bottom 34 (see Figs. 1 and 3) having a series of apertures 36 therein to serve as outlets for air. A connection 37 at the bottom of the tank is connected with a source of compressed air (not shown) which supplies air to the chamber formed by the false bottom and permits it to pass through the apertures 36 into the contents of the tank. The apertures 36 preferably have a smooth surface on the interior of the tank to avoid projections which would engage and restrict the movement of the gluten in the tank. The pressure of the air is sufficient to prevent clogging of the apertures 36 in the use of the apparatus. The air passing upwardly through the liquid agitates it and cooperates in the separation of the starch from the gluten. At the same time the motor 27 may be operated to give the contents a swirling action which will cooperate with the air jets in obtaining maximum results. If desired, liquid may be delivered to the air chamber 38 with the air and forced upwardly through the outlets 36. In operation excellent results have been obtained by the use of air alone.

When the agitation has continued sufficiently long to separate a major part of the starch from the gluten the liquid may be run off through outlets 31 and delivered to the starch converters for converting the starch into sugar. The gluten which forms into a plastic mass may be passed through the outlet at the bottom of the tank by opening the valve 9 therein. Preferably the outlet 8 connects with the secondary tank 5' where more of the starch is separated from the gluten.

The second tank 5', as shown in the preferred embodiment, differs in some respects from the primary tank. As shown in Fig. 4 a conical bottom 6' may join a cylindrical body 20'. The tank may, if desired, have an open top as shown at 41. An outlet 8' is provided at the bottom, controlled by a valve 9'. In the construction illustrated, the outlet nozzles 31' are formed in two adjoining vertical rows with the outlets in the respective rows staggered with respect to each other. These outlets are preferably connected by a common conduit or outlet pipe 32' and controlled by valves 33' for conveying the starch solution from the tank.

In the embodiment of the secondary tank illustrated in Fig. 5 a series of pipes are welded or otherwise secured to the bottom of the tank. Preferably four of the pipes 42 extend the full width of the bottom and four intermediate pipes 44 extend about one-half the distance to the center of the conical portion. The detailed construction of the pipes 42 is illustrated more particularly in the sectional view of Fig. 6 where it will be noted that a pipe sectioned longitudinally has its edges welded or soldered to the bottom of the tank as shown at 45. Suitable air apertures 36' are provided in the bottom of the tank for delivering air into the contents of the tank. The attachments 37' may be utilized for suitable compressed air connections.

It will be understood that the air connection in the primary and secondary tanks including the construction shown in Fig. 8, while differing from each other, may be used interchangeably to accomplish the purpose desired. The liquid to be supplied to the tank may be delivered at the top of the tank or may be delivered with the air at the bottom of the tank.

In Fig. 8 the longitudinally sectioned pipes 42' are shown soldered or welded at their edges 45' to the inside of the receptacle 6' with air outlet apertures 36" directed laterally thereof. The air issuing under pressure from the outlets 36" nearly tangentially gives a swirling movement to the water in the receptacle which increases the effectiveness of the operation.

It will be understood that additional tanks for further removal of the starch from the gluten may be used in the process if desired. It will also be understood that the process may be carried out in a single tank by removing the liquid at the end of the first operation and replacing it successively with fresh liquid or with a weak starch solution.

In the operation of the apparatus ground wheat of suitable fineness may be delivered to the bin 1 and measured out as desired by a scale 2 from which it is delivered to a mixing machine 4 where water is added and a dough or batter made. The dough or batter is then delivered in suitable quantities to the primary tank or receptacle 5 through the manhole 26 or in any other suitable manner. A sufficient quantity of water for separating the starch is then added either in the form of clear water or the wash water from the secondary tank. Preferably one to two parts of water by weight to two parts of ground grain by weight are added. This proportion may vary under different circumstances. If too much water is added the solution which is delivered to the starch converters is not as concentrated as it should be and hence larger converters are required for a given capacity. If insufficient water is added the separation of the starch from the gluten is not as complete as it would otherwise be, hence the proportions depend upon the objective desired.

Air is then injected into the mixture through the inlet 7 and the motor 27 is operated to further agitate the mixture. The air passing upwardly through the mixture and the resulting agitation separate the starch from the gluten. The starch solution may be removed by the outlet nozzles 31 to the starch converters. These nozzles may be utilized as overflows to fix the maximum quantity of water in the tank or they may be used as drains at the completion of the operation.

The gluten is preferably removed from the tank through the outlet 8 at the bottom thereof which preferably is of substantial size; a 12 inch pipe has been found to give good results. The removed gluten is delivered to the secondary tank, which for convenience may be mounted below the primary tank. Water is delivered to the secondary tank and a sufficient quantity of air is delivered thereto through the pipes 42 at the bottom of the tank and inlets 36' to agitate the mixture and to further remove the starch from the gluten. The starch solution, which is much weaker than the starch solution of the primary tank, is preferably delivered to a reservoir 16 from which it is conveyed by pump 17 and conduit 18 to the primary tank in the desired quantities for the operations there. The gluten is removed from the secondary tank in the same manner as described with respect to the primary tank. After removal it may be dried and powdered as described in the copending application of Lou Buck Edsall and James H. Obey, Serial No. 510,082 or it may be used in any other manner for commercial purposes. The starch solution from the primary tank may be delivered to starch converters utilized for commercial purposes.

It will be seen that the present invention provides an effective apparatus and method for separating starch and gluten prior to the conversion of starch into sugar. The gluten is removed before its value has been impaired by heat or devitalization. In addition the starch separated from the gluten can be utilized in manufacturing processes with greater ease and less trouble than when it is mixed with gluten. The process is simple in operation and may be practiced with a minimum of equipment illustrated by the preferred embodiment of apparatus.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described our invention, we claim:

1. In a device for separating starch and gluten, the combination of a receptacle adapted to receive ground grain and water, a valved bottom pipe for drawing off gluten at the bottom, side perforated pipes for drawing off starch, a plurality of tubes on the bottom of said receptacle, air outlets in the said tubes for directing air circumferentially of the receptacle, and means for supplying air to said tubes.

2. In a device of the class described, the combination of a receptacle adapted to receive ground grain and water, means circumferentially of the center for supplying air to said receptacle substantially at the bottom thereof for agitating the water therein and for separating the starch from the gluten in the grain, means at the side of the receptacle for flowing the suspension of starch and water from the receptacle, and central valve means at the bottom of the receptacle for removing the gluten therefrom.

3. In a device for separating starch and gluten, the combination of a receptacle adapted to receive ground grain and water, means circumferentially of the center for supplying air to said receptacle below the level of the water therein to agitate the water and separate the starch from the gluten, means for removing the solution of starch and water from the side of the receptacle, a second receptacle adapted to receive the gluten from the center of the bottom of said first receptacle, means for supplying water to said second receptacle, means for supplying air to said second receptacle below the level of the water to agitate the water therein to separate additional starch from said gluten and means for returning the water and starch from said second receptacle to said first receptacle.

4. In a device for separating starch and gluten, the combination of a receptacle adapted to receive ground grain and water, said ground grain containing starch and gluten, means circumferentially of the center for supplying air to said receptacle below the level of the liquid therein to agitate the liquid and to separate the starch from the gluten, means for removing the solution of starch and water from the side of said receptacle, a second receptacle adapted to receive the gluten from the center of the bottom of said first receptacle and also to receive a supply of water, means for circulating air through the water in the second receptacle to remove additional starch from the gluten, and means for conveying the starch solution from the side of the second receptacle to the first.

5. In a device of the class described, the combination of a receptacle adapted to receive ground grain and water, said ground grain containing starch and gluten, means for circumferentially injecting air at the lower portion of said receptacle to agitate the water therein and to separate the starch from the gluten, mechanical means for stirring the contents of said receptacle to assist in the separation of the starch and gluten, and means for removing the solution of starch and water from the side of the receptacle.

6. In a starch separating device adapted to hold a liquid, the combination with means for admitting streams of air circumferentially of the bottom to agitate the liquid, of a central depression at the bottom for collecting a plastic mass of gluten, stirring means to swirl the liquid, and outlet means at the side of the device for drawing off starch-carrying water.

7. In a starch separating device adapted to hold a liquid, the combination with means for admitting small streams of air at the smooth inner surface circumferentially of the bottom of the device to agitate the liquid without entangling gluten on the device, of a central depression at the bottom for collecting a plastic mass of gluten, stirring means to swirl the liquid, and a series of outlets at the side of the device for drawing off starch-carrying water.

8. In a starch separating device adapted to hold a liquid, the combination with circumferential bottom inlets for admitting air nearly tangentially of the periphery of the device to agitate and swirl the liquid, of a depression at the botom for collecting a plastic mass of gluten, and a series of outlets above the valve for drawing off starch-carrying water.

9. In a starch separating device, the combination with a circular tank for holding liquid, a conical bottom for the tank, a valve at the apex of the cone for drawing off a plastic mass of gluten, means for delivering agitating streams of air through the smooth conical bottom, a mechanical agitating device for agitating liquid to swirl it, and a series of offset outlets in the smooth surface of the tank side for drawing off starch-carrying water.

10. In a starch separating device, the combination with a circular tank for holding liquid, of a conical bottom in which a plastic mass of gluten may collect, air inlets in the bottom around the collecting cone, means for agitating liquid in the tank to swirl it, outlets above the cone for drawing off starch-carrying water, and a valve for drawing off the gluten.

11. In a starch separating device, the combination with a pair of tanks having conical bottoms adapted to receive separated gluten, means for feeding to the first tank water carying ground grain, air delivery means delivering agitating air to the first tank, around its bottom and clear of the gluten, means above the bottom for removing starch-carrying water from the first receptacle, air delivery means delivering agitating air to the second tank, means delivering water to the second tank to wash gluten coming from the first tank, and means above the bottom of the second tank returning to the first tank starch-carrying water from the washing of the gluten.

LOU BUCK EDSALL.
ACTON KEITH KILANDER.

REFERENCES CITED

The following references are of record in the file of this patent:

UNITED STATES PATENTS

| Number | Name | Date |
|---|---|---|
| 235,053 | Gassaway | Nov. 30, 1880 |
| 334,090 | Schuman | Jan. 12, 1886 |
| 560,699 | Firmenich | May 26, 1896 |
| 1,221,990 | Holden | Apr. 10, 1917 |
| 1,418,320 | Miller | June 6, 1922 |
| 2,116,610 | Staley | May 10, 1938 |
| 2,132,251 | Wagner | Oct. 4, 1938 |
| 2,138,274 | Greenfield | Nov. 29, 1938 |